United States Patent [19]

Schaeffer

[11] 4,315,171

[45] Feb. 9, 1982

[54] STEP MOTORS

[76] Inventor: Ernest Schaeffer, 6234 Kentland Ave., Woodland Hills, Calif. 91367

[21] Appl. No.: 95,068

[22] Filed: Nov. 16, 1979

Related U.S. Application Data

[63] Continuation-in-part of Ser. No. 799,302, May 23, 1977, Pat. No. 4,190,779, which is a continuation-in-part of Ser. No. 683,180, May 4, 1976, abandoned.

[51] Int. Cl.³ .............................................. H02K 37/00
[52] U.S. Cl. ..................................... 310/49 R; 310/12
[58] Field of Search .................. 378/254, 138; 310/49, 310/12–14, 156

[56] References Cited

U.S. PATENT DOCUMENTS

| | | | |
|---|---|---|---|
| 2,059,518 | 11/1936 | Harley | 310/150 |
| 3,344,325 | 9/1967 | Sklaroff | 310/49 X |
| 3,411,059 | 11/1968 | Kaiwa | 310/49 X |
| 3,466,518 | 9/1969 | Aylicki et al. | 310/49 X |
| 3,502,914 | 3/1970 | Cox | 310/49 X |
| 3,978,356 | 8/1976 | Spiesberger | 310/49 X |
| 4,031,419 | 6/1977 | Spiesberger | 310/49 |
| 4,190,779 | 2/1980 | Schaeffer | 310/49 X |
| 4,255,696 | 3/1981 | Field | 310/49 X |

Primary Examiner—Donovan F. Duggan
Attorney, Agent, or Firm—Blakely, Sokoloff, Taylor & Zafman

[57] ABSTRACT

Improved step motors for providing linear and angular step-wise motion. In certain embodiments the motors utilize a permanent magnet rotor having a multiplicity of equal pitch (equally spaced) permanent magnetic poles of alternating polarity. The stator has a plurality of pole groups, each pole group having a plurality of poles of the same pitch or spacing as the rotor poles, with each stator pole group being displaced with respect to the other stator pole groups, whereby the poles in the pole groups will successively align with the poles in the rotor in a predetermined sequence upon relative rotation between the rotor and stator. Windings are provided on each stator pole group to selectively polarize the stator poles in the respective pole group in alternate polarity to encourage alignment of the nearest rotor poles therewith. All forms of the invention use one or more stator segments, each of substantially less than 360° in arc length to simplify winding thereof and to make better utility of lamination stock. Linear and rotary devices are disclosed. Permanent magnet embodiments disclosed include multiple permanent magnets making up the rotor poles, and a single permanent magnet having shaped pole pieces. A wound rotor embodiment is also disclosed.

26 Claims, 24 Drawing Figures

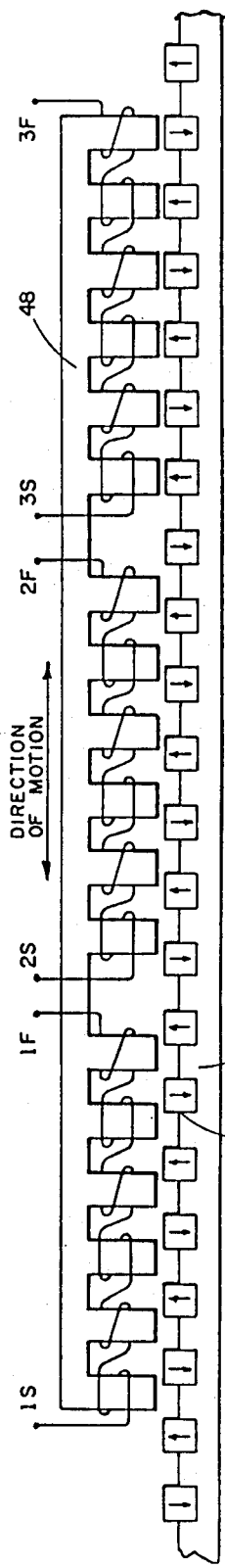
FIG. 8
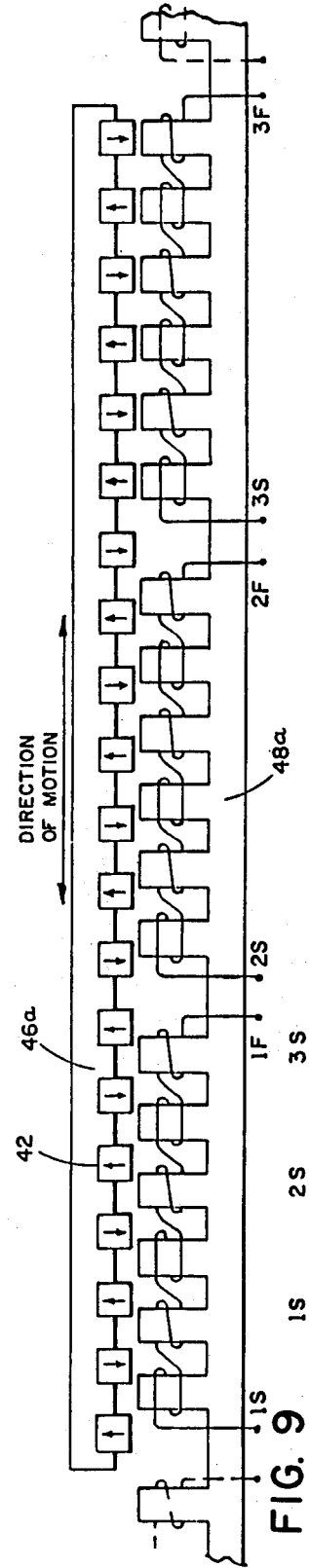
FIG. 9
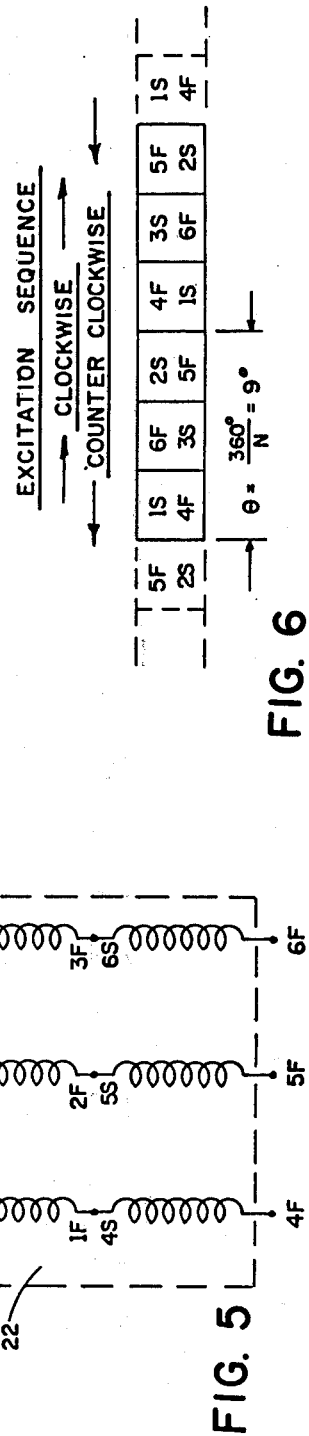
FIG. 6
FIG. 5

STEP MOTORS

This application is a continuation-in-part application of patent application Ser. No. 799,302 filed on May 23, 1977, now U.S. Pat. No. 4,190,779 issued Feb. 26, 1980, which in turn is a continuation-in-part of patent application Ser. No. 683,180 filed May 4, 1976, now abandoned.

BACKGROUND OF THE INVENTION

1. Field of the Invention

The present invention relates to the field of electromechanical devices, and more particularly to stepper motors and the like. 2. Prior Art Step motors, or as they are often called, stepper motors, are motors which are primarily characterized by their step-wise motion resulting from the sequential excitation thereof through the plurality of excitation states of the motor. Such devices characteristically provide a relatively high torque and limited and controllable motion, which is specifically desired in some applications. In recent years the interest in and the application of such devices has grossly expanded, as such devices are ideal in applications requiring closely controlled motion, often sought in automatic equipment, and have excitation and response characteristics easily interfaced with digital equipment to provide an electromechanical drive for computer control. Accordingly, various types of stepper motors are well known in the prior art.

One common type of stepper motor is referred to as a variable reluctance stepper motor, having a wound stator and a soft magnetic rotor. One specific configuration for such devices uses a plurality of wound stators separated axially along the axis of a multiple pole (salient pole) soft magnetic rotor, with the stators being rotated slightly, one with respect to the other, so that each stator may incrementally advance the rotor with respect to the previous stator. By way of specific example, for a configuration having three such stators, each stator would be rotated with respect to the other two by an angle equal to one-third of the pitch between adjacent rotor poles, so that sequentially cycling the excitation between the three stators will advance the rotor position by one rotor pole per excitation cycle. Such a configuration is relatively simple in conception and construction, and may be fabricated having substantially any reasonable number of phases. It has a disadvantage however, of providing a relatively long assembly of the "stack" of wound stators about the single rotor, and accordingly is relatively heavy and bulky for the torque provided. Such motors are described in a book entitled "Theory and Applications of Step Motors" by Benjamin C. Kuo, a West Publishing Company publication (1974).

Another type of variable reluctance motor is described in U.S. Pat. No. 2,249,029. The motor described therein is similar to the motor described hereabove, though only a single wound stator is provided. That stator is divided into segments each having a plurality of poles, with alternate segments effectively representing alternate stators of the hereinbefore described variable reluctance stepper motor. Additional examples of such devices include the disclosures of U.S. Pat. Nos. 3,439,200; 3,535,604; and 3,509,392. Generally speaking, such devices use a single coil to excite all poles within a specific pole group, resulting in adjacent poles within the pole group having the same polarity.

Various types of linear variable reluctance motors are also known. Such devices may be fabricated by merely "flattening out" the pole configuration of a rotary variable reluctance motor at the air gap, and repeating the pole pattern over the particular length of drive required. An example of such a device includes that of U.S. Pat. No. 3,376,518. As shown in the foregoing patent, any such technique may also readily be extended to a second, typically an orthogonal, direction.

Further, variable reluctance motors utilizing some form of bias magnet, e.g., permanent magnet, are also known. By way of example, in the book hereinbefore referred to, a device identified as the CYCLONOME step motor is described wherein a control coil controls the flux pattern of a permanent magnet in such a way as to controllably advance the rotor as a result thereof. Similarly, in U.S. Pat. No. 3,457,482, a permanent magnet is utilized as a bias magnet, with control windings controlling the permanent magnet flux path at the pole faces adjacent the soft magnetic rotor. In these devices it is important to note that the permanent magnets are used as bias magnets, with the control windings being provided on the same magnetic element, e.g., the bias magnets as well as the windings form the "stator", operating in conjunction with a salient pole soft magnetic "rotor".

In addition to the foregoing devices, permanent magnet stepper motors are also well known. One type of such motor, also described in the hereinbefore referred to book, utilizes first and second axially displaced salient pole soft magnetic rotor elements having an axially disposed permanent magnet therebetween so that all salient poles on one rotor element are of one polarity, and all salient poles on the other rotor element are of opposite polarity. A pair of wound stators are provided, each aligned with one of the rotor elements. Each stator has a plurality of pole groups with a single winding for each pole group, and with all poles in all pole groups having the same pitch as the adjacent rotor element. As before, one stator is rotated with respect to its adjacent rotor element in comparison to the other stator-rotor element combinations. The back iron coupling the two stators allows the windings for one or more pole groups in a particular stator to be excited with one plurality, and a corresponding pole group on the other stator to be excited with the opposite plurality.

In essence, the foregoing device is similar to the device of U.S. Pat. No. 2,249,029, with the permanent magnet providing a biasing of the rotor element, and with the second stator rotor element combination providing a duplicate motor for the second pole of the bias magnet. Because of the bias magnet however, the torque provided by any one set of coils is dependent upon the polarity of the excitation provided, and accordingly, the number of excitation states is twice the number of coil sets.

U.S. Pat. No. 3,978,356 discloses a self starting synchronous motor with permanent magnet rotor using a rotor having equally spaced poles of opposite polarity and a nonsymetrical one-piece stator having pole groups each with the same pitch as the rotor. Some of the pole groups are mechanically offset with respect to the other pole groups by a mechanical offset angle apparently selected so as to enhance the self starting characteristics (see also U.S. Pat. No. 4,031,419 of the same inventor disclosing related subject matter). Finally U.S.

Pat. No. 3,344,325 discloses a permanent magnet motor having a rotor of specified numbers of equally spaced opposite polarity rotor poles and a stator comprising individual elements each having two poles and a winding therebetween to polarize the poles with opposite polarity. This disclosure is specifically limited to specific rotor and stator configurations as described therein.

BRIEF SUMMARY OF THE INVENTION

Improved step motors for providing linear and angular step-wise motion. In certain embodiments the motors utilize a permanent magnet rotor having a multiplicity of equal pitch (equally spaced) permanent magnetic poles of alternating polarity. The stator has a plurality of pole groups, each pole group having a plurality of poles of the same pitch or spacing as the rotor poles, with each stator pole group being displaced with respect to the other stator pole groups, whereby the poles in the pole groups will successively align with the poles in the rotor in a predetermined sequence upon relative rotation between the rotor and stator. Windings are provided on each stator pole group to selectively polarize the stator poles in the respective pole group in alternate polarity to encourage alignment of the nearest rotor poles therewith. All forms of the invention use one or more stator segments, each of substantially less than 360° in arc length to simplify winding thereof and to make better utility of lamination stock. Linear and rotary devices are disclosed. Permanent magnet embodiments disclosed include multiple permanent magnets making up the rotor poles, and a single permanent magnet having shaped pole pieces. A wound rotor embodiment is also disclosed.

BRIEF DESCRIPTION OF THE DRAWINGS

FIG. 5 is a schematic representation of the interconnection of the windings of FIG. 4.

FIG. 6 is a diagram illustrating the stepping sequence of the stepper motor of the preceding FIGURES.

FIGS. 8 and 9 are schematic illustrations of two forms of linear stepper motors utilizing the concepts of the present invention.

DETAILED DESCRIPTION OF THE INVENTION

The present invention constitutes unique stepper devices which may be physically constructed in various forms, such as by way of example, rotary devices and linear devices. In essence, this invention is similar to that disclosed in Application Ser. No. 799,302 filed May 23, 1977, now U.S. Pat. No. 4,190,779, though adapts the concepts of that prior invention to split stator and partial stator configurations which have various manufacturing and/or application advantages over those of the prior application. In particular, the use of a split stator, particularly in rotary devices, results in far less lamination material waste because of the more efficient layout of a partial stator as opposed to a full circular stator, and is more easily wound on the back iron because of the easy access thereto without having to use a toroidal winding machine. Because the general concepts of the present invention are the same as those disclosed in the prior application the disclosure of those concepts of the prior application is repeated herein as providing a good explanation of the construction and theory of operation of such motors with a description of the structural differences of the present invention motors over those of the prior application being thereafter given.

Figure 1:
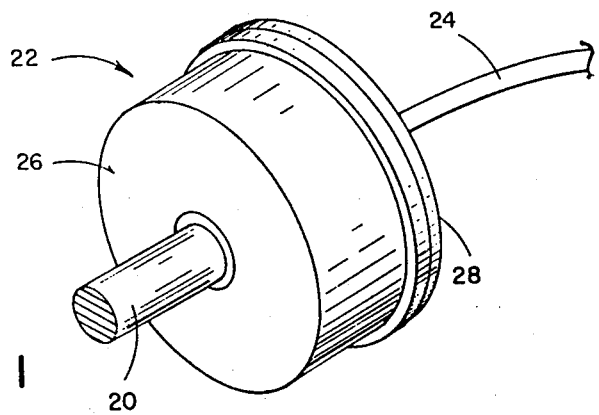
FIG. 1 is a perspective view of a typical stepper motor of the invention of the prior application on which this application is based.
Figure 3:
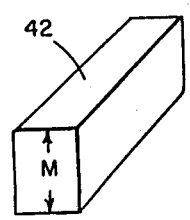
FIG. 3 is a perspective of an individual magnet used in the rotor assembly of FIG. 1.

Thus, as disclosed in the prior application, since rotary devices are perhaps the most commonly and widely used form of stepper motor, such a form of the prior invention shall be described herein as representing the preferred embodiment thereof. Thus, FIG. 1 presents a perspective view of a rotary stepper motor (hereinafter simply "stepper motor") embodying the principles of the invention. The packaged stepper motor, as shown, is relatively conventional in exterior characteristics, being characterized by a centrally extending shaft 20 bearing supported on a housing assembly 22 and having a cable 24 containing a plurality of leads. The particular embodiment shown has a frame assembly 22 comprising principally a flanged housing member 26 carrying one bearing for the shaft 20, and back plate 28 carrying the second shaft bearing. Members 26 and 28 are fastened together by screws adjacent the periphery of plate 28, with the resulting flange region providing a suitable flange mount for the motor in an assembly in which it is used. As shall subsequently be seen, the motor electrically may be made to be the same as prior art stepper motors, so that conventional stepper motor drive circuitry may be readily used with the invention. Such circuitry, by way of example, is described in the book Theory and Applications of Step Motors previously referred to herein. The main distinguishing characteristic of the assembled motor of FIG. 1 is its characteristic pancake design, that is, a relatively short or thin motor assembly in the axial direction. It is important to distinguish this feature from the characteristics of prior art stepper motors, which generally utilize two or more wound stator assemblies displaced axially along a rotor assembly, thereby resulting in a relatively long assembly if substantial torque is to be provided, or in the alternative, characteristically having a large step angle so as to require substantial gear reduction. In the figures to follow which illustrate the geometric relationship of the rotor and stator, the rotors are generally illustrated with specific physical orientations with respect to the stators which do not necessarily correspond to the motor OFF and/or motor ON stable (cogging) positions.

Figure 2:
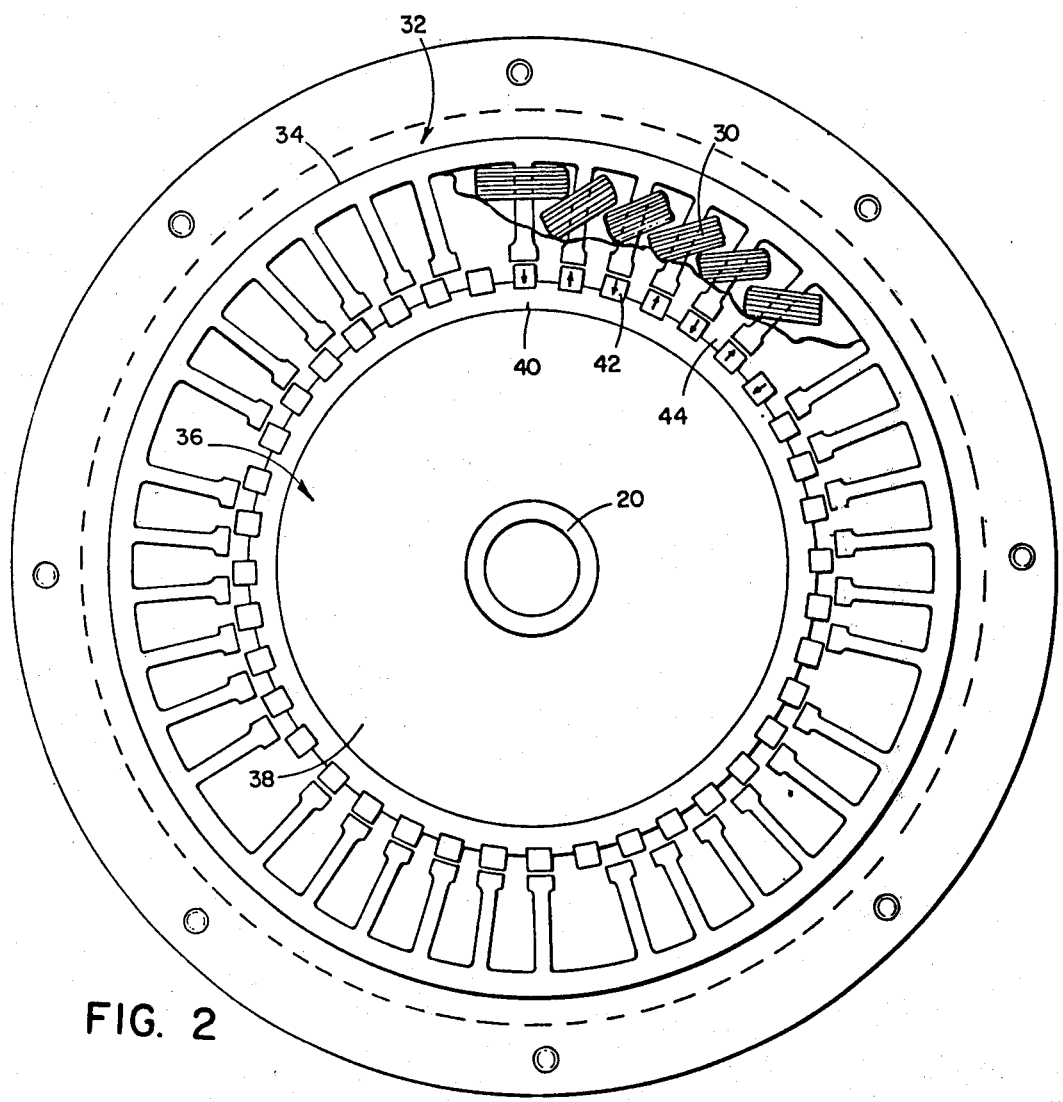
FIG. 2 is a cross section of the stepper motor of FIG. 1.

Now referring to FIG. 2, a rear view of the motor of FIG. 1 with the back plate 28 and rear bearing removed may be seen. In this figure only a portion of the winding 30 is shown so that the details of the stator stack may also be seen. (In this embodiment the stator core comprises a stack of laminations of soft magnetic material fabricated in the conventional manner. Also as used herein the words "soft magnetic material" refer to the various well-known materials characterized by their relatively high permeability and relatively low retentivity, whereas the words "permanent magnets" and/or "permanet magnetic materials" refer to materials characterized by their relatively high retentivity, also normally having a relatively low permeability.) The stator stack, generally indicated by the numeral 32, is characterized by a relatively narrow ring of back iron 34 containing, in this embodiment, six pole groups each having a plurality of inward directed poles disposed adjacent the rotor, generally indicated by the numeral 36. It will be noted that each of the six pole groups contain an even number of poles, more specifically six poles in the embodiment shown, with each of the pole groups being equally spaced about the air gap circle in 60° increments.

The rotor 36, having a hub 38 and shaft 20, is characterized by a ring of soft magnetic material 40 supporting a plurality of equally spaced magnets 42 about its periphery. The magnets 42 are generally approximately axially aligned (physically, not magnetically) along the rotor adjacent the poles of the stator (though skewing may be used if desired). As may be seen in FIG. 2, the pitch or separation of the magnets is the same as the pitch of the poles of each pole group, though with the rotor in the position shown, only two pole groups, specifically diametrically opposed pole groups, are in alignment with the magnets 42. (The region 44 between magnets is filled with a plastic material so that the outside diameter of the rotor, when ground, will be a generally uninterrupted cylindrical surface.)

Now referring to FIG. 2, a perspective view of an individual magnet 42 taken on an expanded scale may be seen. In particular the direction of magnetization of the magnets 42 is indicated in that figure, with the magnets being positioned on the rotor in alternate orientations so that the magnetic poles presented to the stator poles are of alternate polarity, e.g., north-south-north-south, etc.

Figure 4:
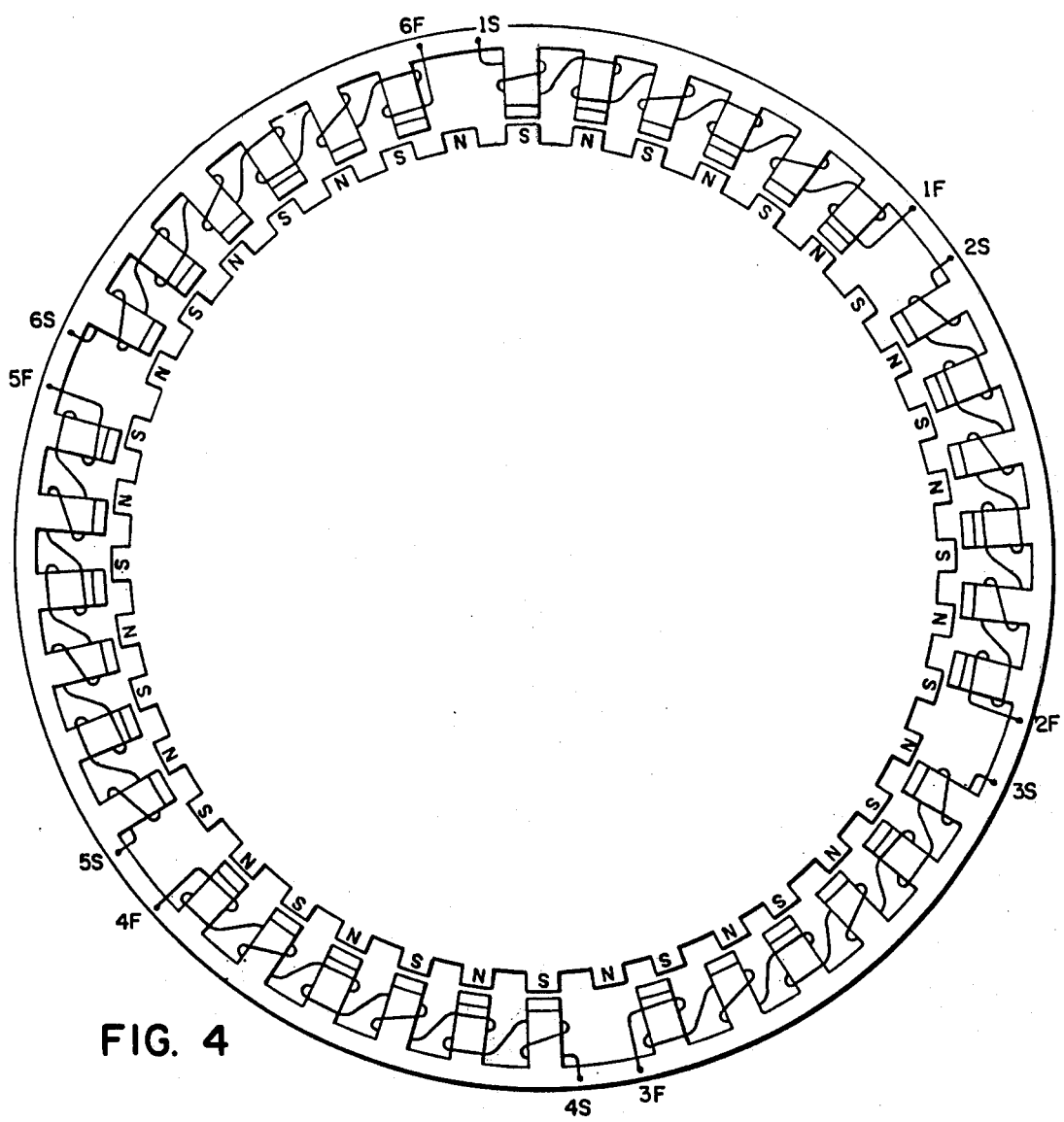
FIG. 4 is a schematic representation of the rotor stator combination of the embodiment of FIG. 1 illustrating the winding arrangement therein.

Now referring to FIG. 4, a schematic representation of the rotor and stator of the stepper motor showing the relative direction of the windings of the stator may be seen. It will be noted that within each pole group, adjacent poles are wound in the opposite sense, each with the same number of turns, so that current through the coils of any one pole group will create adjacent poles of opposite polarity within the pole group. Further, as shown in FIG. 5, the coils for diametrically opposed pole groups are connected in series within the stepper motor housing. Thus, the finish lead 1F for the coils for the first stator pole group is connected to (or integral with) the start 4S of the coils for the fourth pole group, with the start and finish leads 1S and 4F being brought out in cable 24. As may be seen in FIG. 5, this arrangement is repeated for coil sets 2 and 5, and 3 and 6, thereby providing six external leads to the cable 24. Such series connections, however, are not a necessity, as a parallel winding, by way of example, may also be used as shown in the fragmentary view of FIG. 15. Also, the space between the pole groups of FIG. 5 may be occupied by an unwound pole, or for that matter an odd number of wound poles could be used for each pole group, as magnetic balancing would be achieved by the diametrically opposite odd number of poles in the other pole group of the same phase, providing an even number of stator poles for that phase. Such an arrangement is not preferred however, and in the lower limit is directly contrary to the teachings of the present invention, as individual, diametrically opposed stator poles avoid the advantages of the stator pole groupings of the invention.

In the orientation shown in FIG. 4, it will be noted that two groups of rotor poles are generally aligned with the pole groups 1 and 4 on the stator, whereas the rotor poles adjacent stator poles 2 and 5 are displaced in one direction therefrom, and the rotor poles adjacent stator pole groups 3 and 6 are displaced in the opposite direction therefrom. Accordingly, the permanent magnets adjacent stator pole groups 2 and 5 encourage the rotor in one direction, and permanent magnets adjacent pole groups 3 and 6 encourage the rotor in the opposite direction, thereby providing a substantially zero net torque on the rotor. However, there is a relatively strong magnetic force encouraging the rotor to remain in the fixed positions as a result of the magnetic force on pole groups 1 and 4, thus providing a substantial magnetic locking of the rotor in the position shown, or a substantial magnetic cogging effect if the rotor is forceably rotated therefrom.

When a positive voltage is applied to terminal 1S with respect to terminal 4F, the poles in pole groups 1 and 4 are magnetized with polarities opposite the polarities of each of the adjacent rotor poles, and accordingly the rotor is firmly magnetically locked into the position shown. It will be noted that in this condition the rotor poles are displaced in clockwise direction one-third of a rotor pole pitch with respect to pole groups 2 and 5, and one-third of a pole pitch in the counter-clockwise direction with respect to pole groups 3 and 6. Thus as shown in FIG. 6, and for the winding sense shown in FIG. 4, a shift of the excitation from terminals 1S and 4F to terminals 6F and 3S will result in the magnetization of the stator poles for pole groups 3 and 6 so as to encourage the rotor to rotate in a clockwise direction by one-third the rotor pole pitch to align with the respective stator poles. Similarly, for rotation in the opposite direction by an angle equal to one-third the rotor pole pitch, the excitation may be shifted to terminals 5F and 2S.

By stepping the excitation in the sequence shown in FIG. 5 from left to right results in a clockwise rotation of the rotor (referenced to FIG. 4), with each step resulting in a 3° step of the rotor, whereas stepping the excitation in the sequence of FIG. 5 reading from right to left results in the stepping of the rotor in a counter-clockwise direction. Obviously the stepping sequence repeats itself, though it will be noted that effectively there are three externally available coil connections ("phase"), but are six excitation states for these three coil connections, as the permanent magnet rotor makes the device sensitive also to the polarity of the excitation.

Having now described the construction and operation of one embodiment, certain design considerations, some of which constitute requirements and others of which are merely expedients or conveniences, will now be described. Since the rotor poles alternate in polarity, an even number of rotor poles is used in a rotary device. Also, since the stator poles in any pole group must be magnetizable with polarities complimentary to the adjacent rotor poles in that pole group, generally an even number of poles in any stator pole group will be used. It should be noted that with this arrangement the back iron between poles in any stator pole group need only carry the flux of two rotor and stator poles, thereby minimizing the amount of back iron required and maximizing the air gap diameter for a given case size and enhancing the torque produced. As a matter of fact, the back iron need not even couple adjacent pole groups, or even couple more than two adjacent poles of opposite polarity within one pole group, though such an arrangement may alter the flux distribution somewhat. However, in most cases, it has been most convenient to use a continuous back iron ring 34 (see FIG. 2) for angular location and positional stability of the overall stator assembly, and for production ease. In that regard, while two and three phase machines are perhaps most common, there is really no limit to the number of states that could be used, even one state for each stator pole pair. Obviously odd numbers of stator pole groups could be used.

The device described hereinbefore may be referred to as a three "phase" device, since effectively three sets of windings are accessible electrically through cable 24, each phase representing the series combination of the windings of two diametrically opposed pole groups. Such an arrangement provides a balance in the radial magnetic forces on the rotor, a result generally desirable with rotary electro-magnetic devices. Accordingly, there are six pole groups in this device, forming the three phases, with the polarity sensitivity of the device providing six excitation states (e.g., plus and minus states for each phase). Alternately, three excitation states may be used, providing twice the step angle per step.

Thus for magnetic symmetry, it is preferred to provide diametrically opposed pole groups for each phase. For a three phase machine, the stator poles for each of the other two phases are physically rotated with respect to the corresponding rotor poles by one-third and two-thirds of a rotor pole pitch, respectively, (or plus one-third and minus one-third of the rotor pole pitch, as a plus two-thirds and a minus one-third pitch rotation differs only in the winding sense or excitation polarity which must be used for the proper stepping of the device).

It will be noted that in the three phase device so far described, the stator further has a geometric symmetry in that the second stator pole group is physically displaced from the first pole group by exactly 60°; the third pole group is displaced from the first pole group by exactly 120°, etc. Such a geometry symmetry, though not required, is convenient and perhaps functionally desirable. This physical symmetry of the stator assembly provides specific limitations on the number of rotor poles which may be used. In particular, for the three phase machine shown, there must be $n \pm \frac{1}{3}$ rotor poles in each 60°, or $N = 6n \pm 2$, where n is an integer, and N is the number of rotor poles. Thus for stator physical symmetry in a three phase device having magnetic symmetry by diametrically opposed pole groups within the same phase, the number of rotor poles which may be used include, by way of example, 22, 26, 28, 32, 34, 38, 40, 44, 46, 50, etc. (The lowest number of rotor poles satisfying the foregoing requirement is 4, which provides a configuration having only single diametrically opposed poles for any stator "phase", a configuration not in keeping with one of the concepts of the invention, that is, stator pole groups having within each pole group an even number of poles, wound to provide alternate polarities on adjacent poles within the group.) The specific embodiment hereinbefore described has forty rotor poles, thus providing the physical symmetry in the stator. It should be noted, however, that similar devices may be fabricated using some other even number of rotor poles, such as by way of example, a device very similar to that hereinbefore described but using thirty-six rotor poles. Such a device, however, will have stator poles which cannot be disposed exactly 60° with respect to each other in order to obtain the plus or minus one-third pole pitch displacement required for uniform stepping.

It should be noted that if the radial magnetic force need not be balanced, a three phase machine may use stator pole groups repeating every 120°. Thus, within any 120° the number of rotor poles must be $n \pm \frac{1}{3}$ or $N = 3n \pm 1$ for the full 360°. Since a number of rotor poles N must be an even number, n must be an odd number; and for a practical system the available selections for number of rotor poles is the same as for the magnetically balanced system.

By way of further example of the foregoing, if a two phase machine (four electrical states) is desired having the magnetic balancing or symmetry, and also having a physically symmetrical stator stack, the stator pole groupings must repeat every 90° (e.g., repeat four times), with the number of rotor poles within a 90° segment $= n \pm \frac{1}{2}$. Thus, $N = 4n \pm 2$, which gives allowable rotor pole numbers such as 34, 38, 42, 46, 50, etc.

Figure 7:
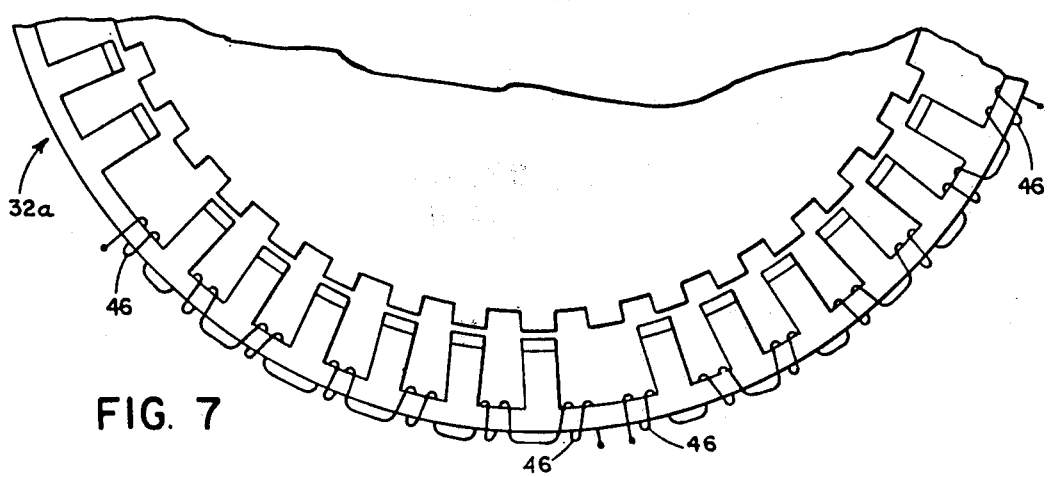
FIG. 7 is a diagram similar to FIG. 4 illustrating an alternate winding form.

Now referring to FIG. 7, an alternate form of winding may be seen. In particular, this figure schematically illustrates a toroidal winding for the stator assembly 32a, a technique generally well-known in the prior art of electromagnetic components. A toroidal winding, however, has one difference which should be noted. Specifically, an odd number of coils are provided for an even number of stator poles. Accordingly, if the same number of turns is used on each coil, there is a net circumferential MMF resulting from any one stator pole group. Though this net MMF does not cause any particular problem if the net for all pole groups in each phase is zero, and in fact may add to the damping of the rotor, it may be eliminated if desired by providing the end coils 46 in each stator pole group with half the number of turns of the intermediate coils.

Now referring to FIGS. 8 and 9, exemplary schematic diagrams of two linear motors may be seen. The general principal of operation of these two motors is the same, though one utilizes a "stator assembly" of limited extent and a "rotor assembly" extending over the full length of travel of the motor, whereas the other utilizes a rotor assembly of limited extent and a stator assembly extending over the full range of travel. Thus in the embodiment of FIG. 8, a rotor assembly comprising a soft magnetic back iron member 46 having a plurality of magnets 42 of a given linear pitch (spacing) and of alternate polarities is provided. This rotor assembly extends over the length of the travel desired, or more appropriately the length of travel desired plus at least one stator length so that the rotor and stator remain in a cooperative disposition throughout the length of travel. The stator assembly is similar to the stator assemblies hereinbefore described, particularly with respect to FIGS. 2 and 4, in that a common soft magnetic core defines three pole groups, each having six poles in each group, with each pole group being wound to provide poles of alternating polarity within each pole group. Further, each pole group is displaced one-third of the rotor pole pitch to provide the desired stepping action by sequentially stepping the excitation through the three windings (and of course with reverse polarities also to provide six states as in the previously described embodiment). The embodiment of FIG. 9 is similar, though the pole group pattern of the stator is repeated, typically with the windings of every third pole group being coupled together, and with the rotor spanning three pole groups so as to always be adjacent one of the excited pole groups. Of course, in either of these embodiments, the "rotor", that is the portion of the device carrying the permanent magnets, may be the movable member, or alternatively the wound "stator assembly" may be the movable element, independent of which is the larger element. Similarly, while the embodiments of FIGS. 8 and 9 have been described with respect to a linear device suggesting a flat pole surface, the rotor and stator assemblies may be of other configurations such as circular, with FIGS. 8 and 9 representing a cross-section showing the air gap at a plane extending through the axis of the device. Furthermore either of these devices may be extended to a two dimensional drive by using square (or rectangular) poles on the rotor and stator assemblies and extending each to the second dimension in accordance with the schematic representations of either FIG. 8 or FIG. 9.

Figure 10:
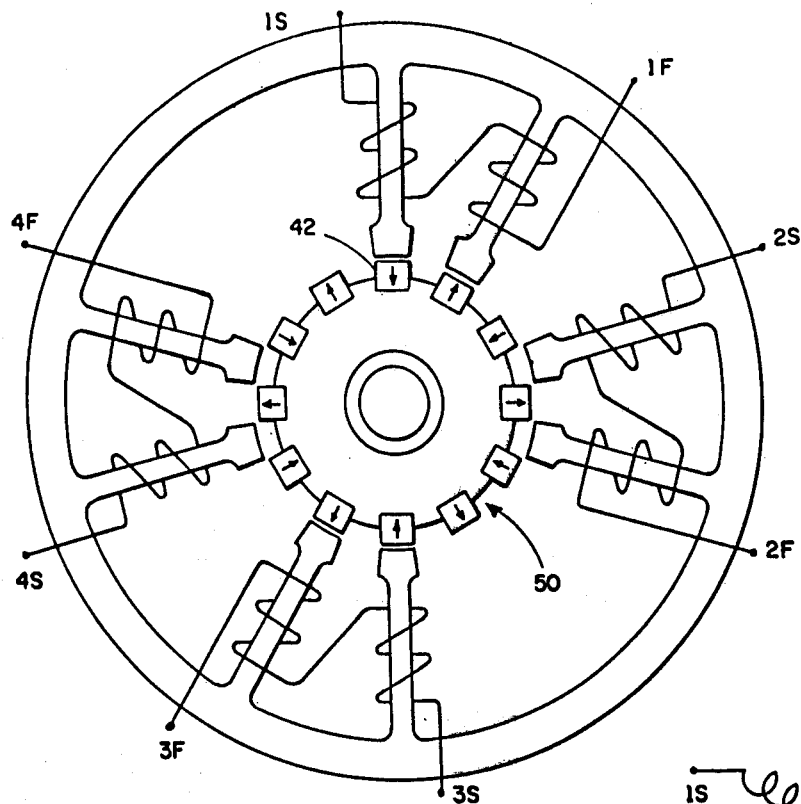
FIG. 10 is a schematic representation of a two phase nonsymmetrical stator stepper motor.
Figure 11:
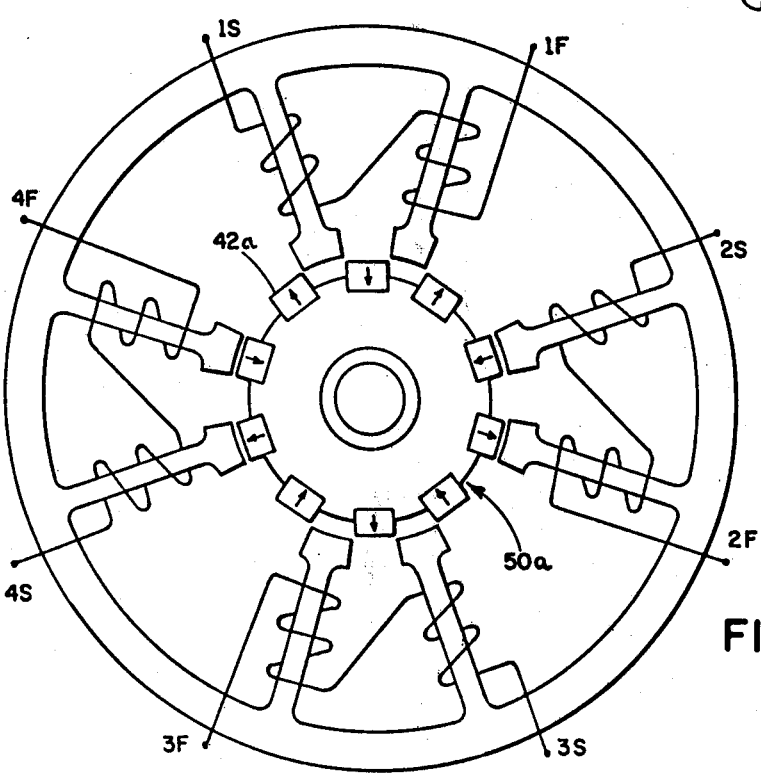
FIG. 11 is a schematic representation of a two phase symmetrical stator stepper motor.

Now referring to FIG. 10, another embodiment representing one of the simpler forms for rotary devices may be seen. In this embodiment each pole group is comprised of two poles, with diametrically opposed pole groups being coupled in series to provide for the balancing of the radial magnetic forces (e.g., finish lead 1F being coupled to finish lead 3F so that excitation is between 1S and 3S for the first phase, etc.). It will be noted that the second and fourth pole groups are not disposed 90° away from the first and third pole groups respectively, but are disposed at an angle other than 90° thereby making the stator unsymmetrical in comparison to the stator of FIG. 2. It will also be noted that there are twelve magnets 42 on the rotor assembly, generally indicated by the numeral 50. For a two-phase device, it was previously indicated that a symmetrical stator could be used if the number of rotor poles was in accordance with the equation: $N=4n\pm 2$, where n is an integer. Accordingly, $N=12$ does not satisfy that equation, thereby giving rise to the unsymmetrical stator. Thus the embodiment of FIG. 10 is an example of a two-phase device (four excitation states) having a magnetic symmetry but a geometric assymmetry in the stator assembly. (By simply changing the number of rotor poles to ten as shown in FIG. 11, and reproportioning the assembly accordingly, a two pole device having a physically symmetrical stator is achieved.)

There has been described herein in detail various embodiments of the invention of the prior application, including two and three phase rotary devices having physically symmetrical and physically unsymmetrical stator assemblies, and two forms of linear devices. In the preferred embodiments high energy permanent magnets are used in the rotor, with individual magnets being attached to a rotor assembly as indicated in the various embodiments herein.

Figure 13:
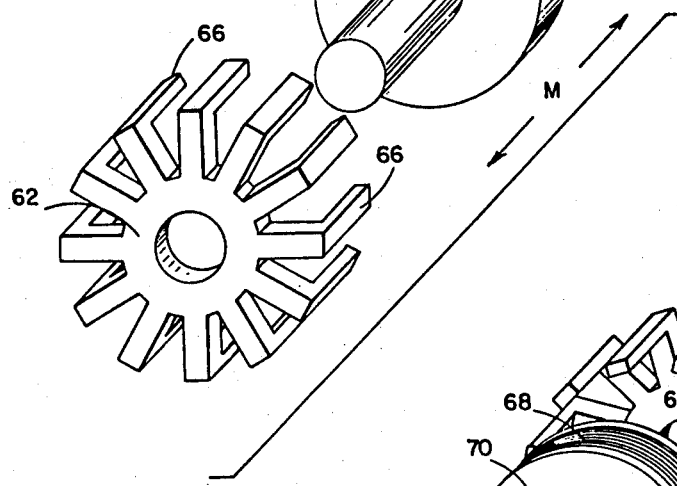
FIG. 13 is an exploded perspective view of an alternate single permanent magnet rotor which may be used with the stepper motor embodiment of FIG. 10.
Figure 14:
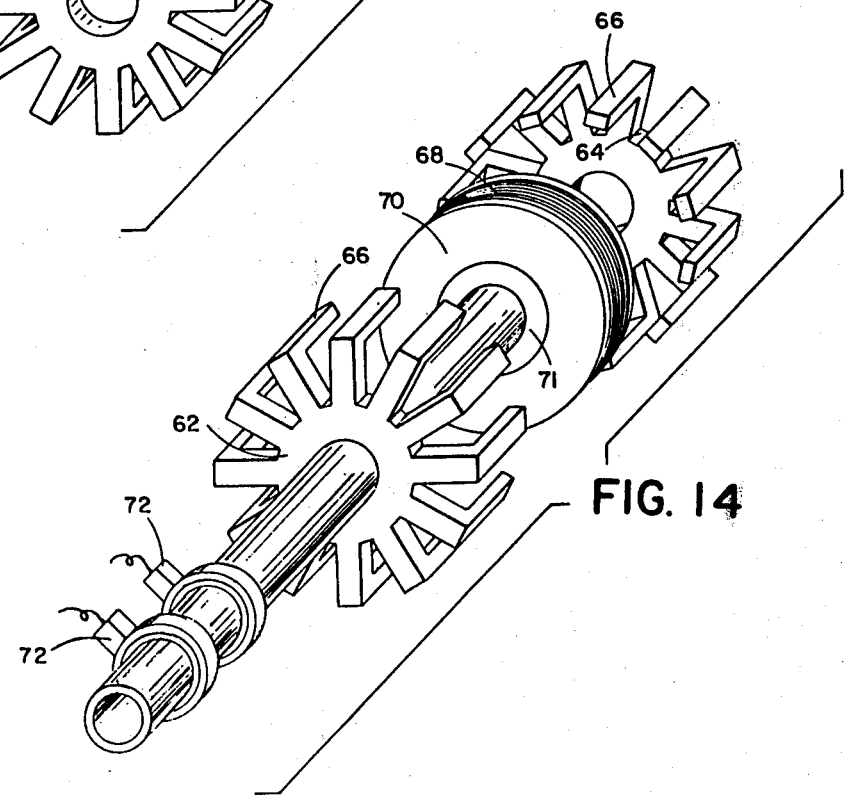
FIG. 14 is an exploded perspective view of a further alternate wound rotor which may be used with the stepper motor embodiment of FIG. 10.

The coplanar arrangement of the stator pole groups allows the fabrication of pancake type devices to provide maximum torque in the shortest possible length (the word "coplanar" as used herein is used in the general sense to mean that the various poles or pole groups are generally arranged in the same axial position, rather than being stacked one behind the other as in many prior art permanent magnet stepper motors utilizing two or more stacked stator assemblies). Of course the invention may also be utilized to provide steps of very small angular extent by providing additional stator assemblies, one behind the other, and angularly offsetting each slightly so as to provide additional excitation states to subdivide the effective angular steps of any one stator assembly. However, where applications allow, the simple coplanar arrangement utilizing a common back iron ring provides the best mechanical simplicity providing a highly efficient and compact stepper motor. (As used herein the words "back iron" are used in the general sense to denote an integral interconnecting soft magnetic core mechanically coupling all of the stator poles.) It should be understood that while two and three phase embodiments have been described in detail herein, the invention is not so limited, and may be readily extended to any larger number of phases so as to further subdivide the stepping angles. Similarly, a "rotor assembly" may simply constitute a single permanent magnet body magnetized to provide the desired multiple pole arrangement, or a soft magnetic rotor having poles wound and excited to provide the desired multiple pole arrangement. Examples of one type of single permanent magnet rotors and wound rotors may be seen in FIGS. 13 and 14. In FIG. 13 the multiplicity of equal pitch (equally spaced) magnetic poles is produced by one or more magnets 60 sandwiched between the soft magnetic pole pieces 62 and 64. The pole pieces 62 and 64 are configured equal numbers of projecting segments or teeth 66 so that when they are assembled with the magnet 60 sandwiched between them, the segments 66 of each pole pieces 62 and 64 are interlaced with approximately equal spacing. With the magnet 60 polarized North-South along its axis (the shaft axis), it may readily be seen that the segments of one of the pole pieces 62 are magnetized to one polarity while the segments of the other pole piece are magnetized to the opposite polarity. In this manner, alternate magnetic poles occur at the rotor interface in the same manner as the other embodiments of the invention utilizing individual magnets. In FIG. 14 the same result is achieved using a single winding 68 in a plastic bobbin 70 disposed on a soft magnetic member 72 coupling the two pole pieces 62 and 64. Electrical connections for the winding 68 may be brought out through conventional slip ring assemblies 72 illustrated schematically in the figure. By exciting the coil 68 with a DC current the desired alternating rotor poles are obtained (actually, this configuration as well as other wound rotor configurations could operate on AC excitation, the stepping of course being dependent not upon the frequency of the AC excitation used but upon the stepping of the excitation in the same manner as the previously described embodiments).

Figure 12:
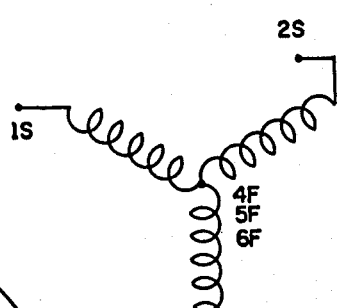
FIG. 12 is a schematic illustrating a wye connection for a three phase stepper motor such as that described with respect to FIGS. 1 through 5.

Also while the lead and excitation scheme for the embodiment of FIGS. 1 through 4 was illustrated in an exemplary manner in FIGS. 5 and 6, it is to be understood that other lead arrangements and excitations may readily be used. By way of specific example, in a three phase device the three phases may be coupled as shown in FIG. 12, with only the three start leads being brought out. This type of connection still provides six states, as any one lead is driven with respect to the other two leads. By way of example, with 1S at +V and 2S and 3S both at ground the first phase is excited, with the other two phases each having an excitation of one-half of that of the first phase. Though both phase 2 and phase 3 result in a torque on the rotor, it may be shown that these two torques are in opposite directions, thereby effectively cancelling each other, at the rotor equilibrium position. The advantage of such connection, however, is that the excitation of phases not resulting in driving torques still results in damping of rotor motion, minimizing overshoot and settling time problems. Of course any other of various well known connections and excitation arrangements may also be used, as the general behavior of the devices of the present invention in terms of excitation and dynamics is similar to those of the prior art.

Figure 15:
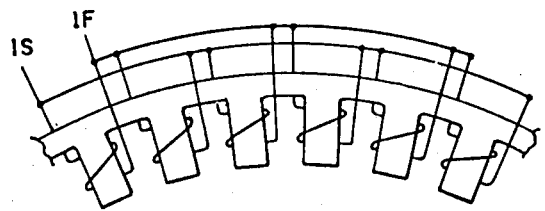
FIG. 15 is a segment of a stator showing the parallel connection of stator pole windings in a stator pole group.
Figure 15:
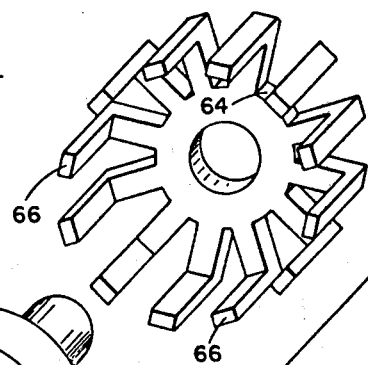

By way of example, the winding connections shown in FIGS. 4, 7, 8 and 9 illustrate individual coils within a phase connected in series, which is convenient for the majority of applications. Series connection of the coils is not essential to the invention however. Specifically, referring to FIG. 15 showing a schematic representation of a portion of the stator of a stepper motor in accordance with the invention, a parallel connection of individual coils within a pole group may be seen. The coils within a pole group may also be connected in numerous series-parallel combinations with no effect on the operational mode of the invention. The optical parallel or combination seriesparallel coil connection is also applicable to the alternate winding form shown in FIG. 7, the linear motor embodiments shown in FIGS. 8 and 9, and in the 2 phase, 4 state embodiment shown in FIG. 10.

Figure 16:
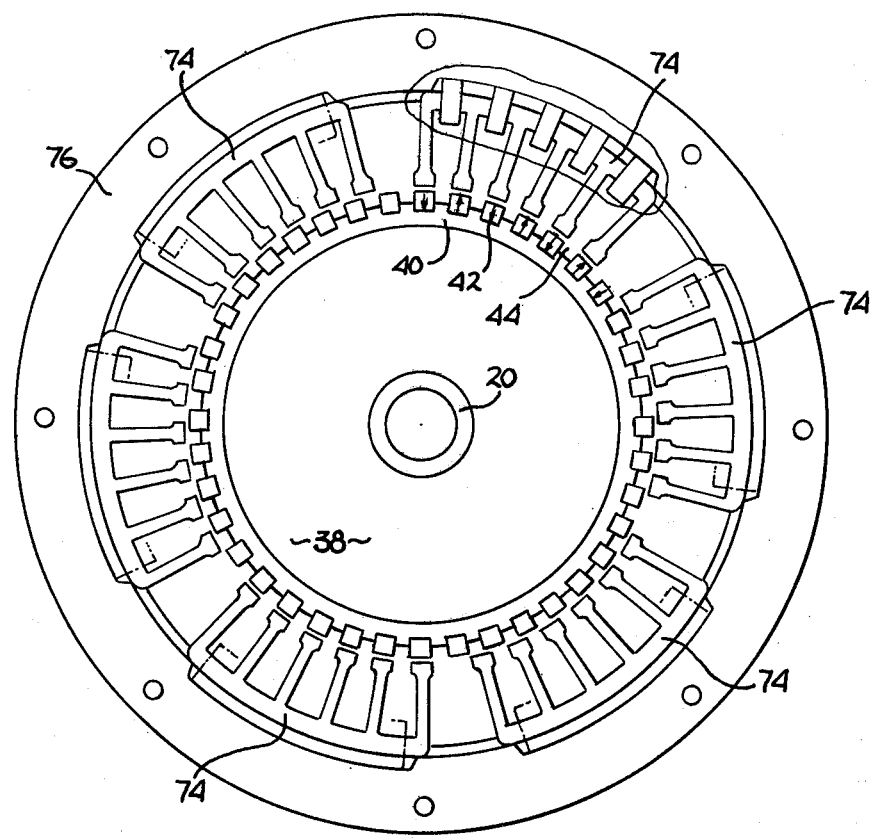
FIG. 16 is a view of a step motor in accordance with the present invention, illustrating the use of individual stator segments.
Figure 17:
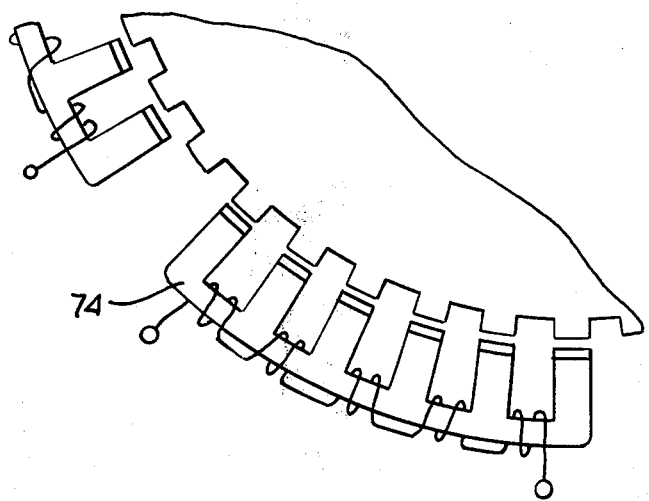
FIG. 17 is a diagram illustrating one form of winding for the stator segments of the step motor of FIG. 16.

The present invention recognizes that the motors hereinbefore described may be realized with substantially the same performance using segmented stators, and that such segmenting provides various economies of materials and fabrication, allowing the fabrication of lower cost motors without meaningful loss in performance. Further the present invention recognizes that while the rotors preferably are continuous, suitable performance can be achieved utilizing forms of discontinuous rotors which rotors may have advantages in certain applications. These aspects of the present invention are hereinafter described in relation to new embodiments, some of which will be readily recognizable as being similar in electrical characteristics to previously described embodiments. Thus, as a first embodiment, a schematic cross-section of a three-phase motor similar to that of FIG. 2 may be seen in FIG. 16. Rather than a continuous stator ring as in the prior embodiments, each pole group of the embodiment of FIG. 16 is comprised of a separate stator segment 74, the six stator segments 74 being appropriately positioned and retained in the housing 76 so as to provide the same relative pole group positioning as in the embodiment of FIG. 2. Winding of these various stator segments may be done in a manner identical to that of FIG. 4, or in the alternative to that of FIG. 7, as illustrated in FIG. 17. The winding on the back iron of each segment as shown in FIG. 17 is preferred, however, because of the ease of winding directly on the back iron by an appropriate winding machine. Thus, in comparison to the hereinbefore described embodiments, the embodiments utilizing the segmented stators allow the rapid and efficient winding directly on the insulated, segmented stator as opposed to the required use of a toroidal winding machine for winding on the back iron, or in fitting coils over the poles in a conventional winding of a full circular stator. Another advantage of using the stator segments is the fact that they allow much more efficient use of the lamination iron as they may be punched in a much more efficient pattern (even with uniform grain alignment, if desired) than a full circular stator lamination may be punched. In particular, the circular lamination results in a relatively large waste of lamination material at the center thereof as well as between laminations, not encountered with the segmented stator designs.

One other aspect of the motors described herein, both of the segmented and unsegmented designs, is the ability to wind such motors to provide full stator redundancy in a highly compact physical configuration. In particular, it was previously pointed out with respect to the solid or one-piece stator designs that such designs could be fabricated with radial magnetic balancing, such as through the use of diametrically opposed pole groups which are simultaneously excited. Thus the motors of FIGS. 2 and 16 may be so wound if desired. As an alternative, however, the motors of FIGS. 2 and 16 may be wound so that three stator pole groups or segments comprise a full operative three phase motor, with the remaining three pole groups or stator segments being wound so as to provide (in combination with the rotor) a full redundant motor for extremely high reliability requirements. Separate motor control systems may be provided so as to provide full redundancy without requiring separate motors with gearing etc. or even separate rotors on a common shaft.

Figure 18:
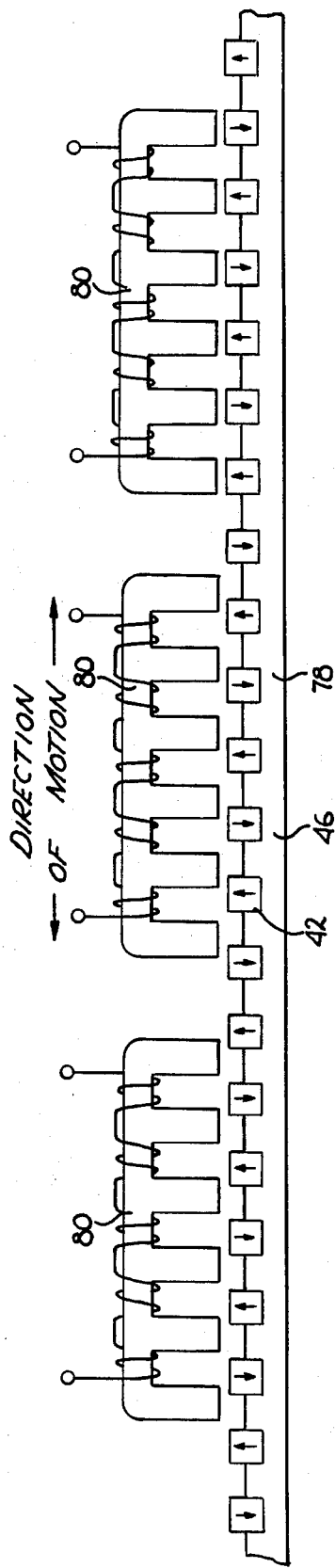
FIG. 18 is a schematic representation of a linear step motor having a stationary rotor and movable stator.
Figure 19:
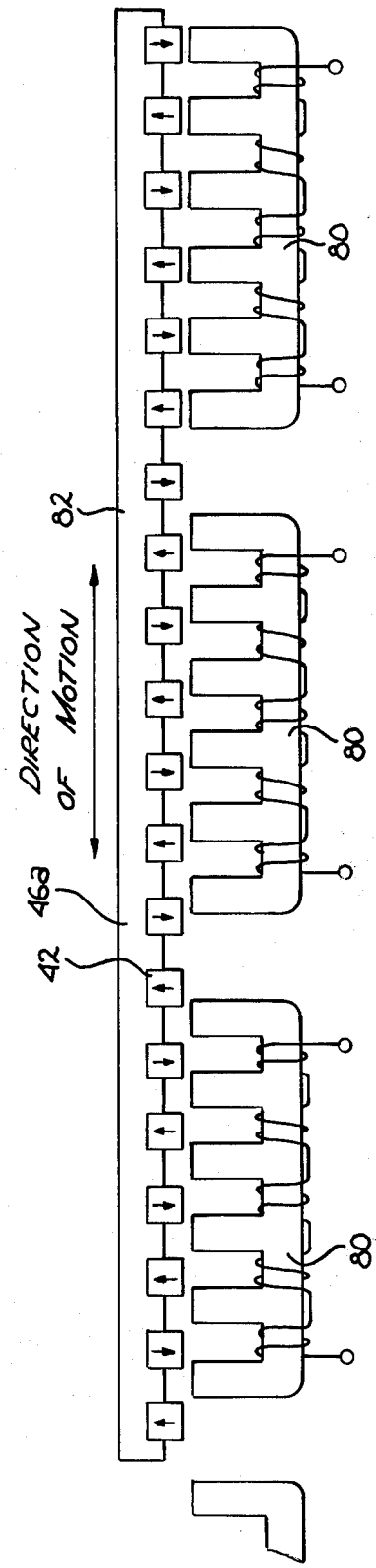
FIG. 19 is a schematic representation of a linear step motor having a stationary stator and movable rotor.

The linear embodiments of FIGS. 8 and 9 may also be realized using individual stator segments such as shown in FIGS. 18 and 19. In FIG. 18 a continuous rotor element 78 spanning the length of movement required is used in conjunction with three stator segments 80 positioned to provide a three phase linear stepper with respect to the rotor element. In the embodiment of FIG. 19 the stator segments 80 are disposed in a continuous pattern to span the length of movement required with a rotor 82 of limited extent being provided to span three stator segments as shown. Obviously, the use of such stator segments in these embodiments, as well as the embodiment hereinbefore described with respect to FIGS. 16 and 17 and in some of the embodiments hereafter described, allows the selective positioning of the stator segments to realize either two phase or three phase (or any number of phases) motors using the same rotor and stator segments by simply positioning the stators as desired for the number of phases desired in accordance with the description of stator pole position requirements hereinbefore provided.

Figure 20:
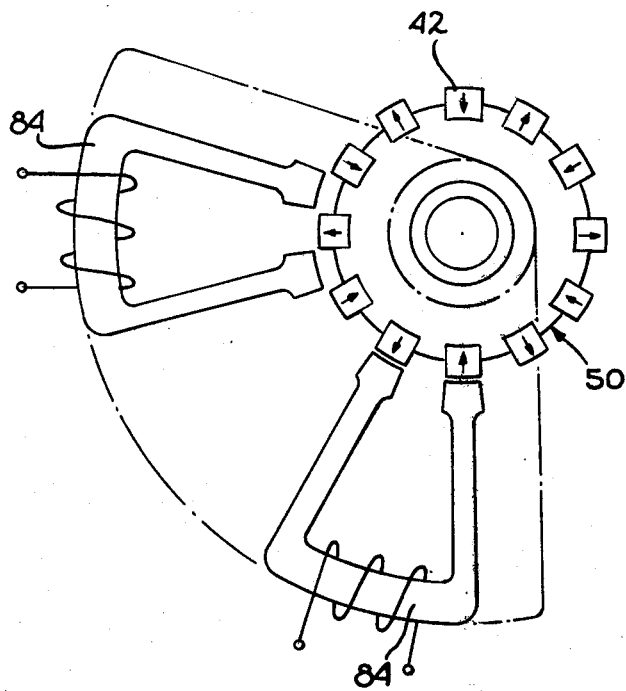
FIGS. 20 and 22 are schematic representations of step motors having stators comprised of individual stator segments collectively spanning an arc about the rotor of less than 180 degrees.
Figure 21:
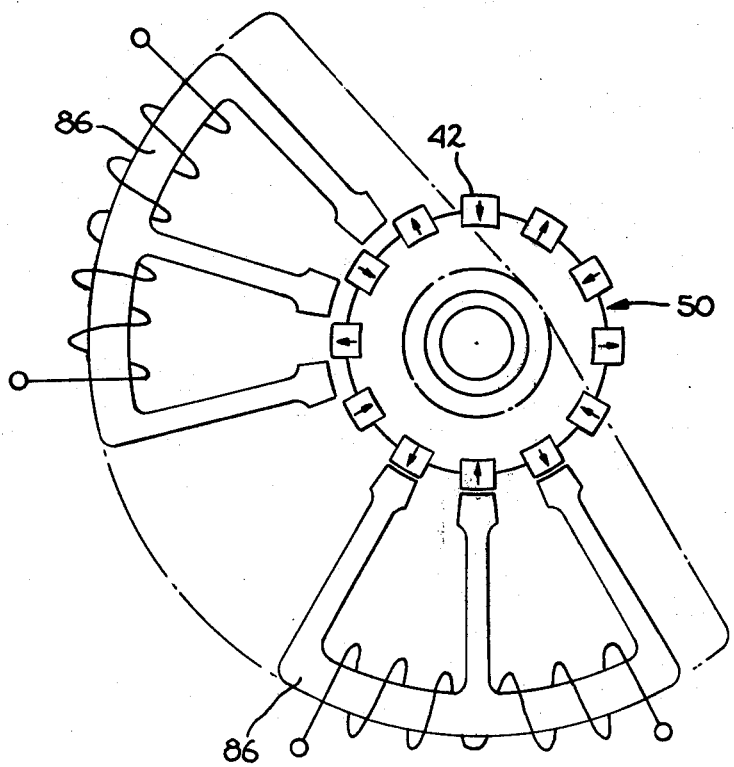

Now referring to FIGS. 20 and 21, additional embodiments utilizing the same rotor 50 as in FIG. 10 may be seen. The embodiment of FIG. 20 illustrates the use of a simple pair of stator segments 84, each presenting a single stator pole pair to the rotor to provide a two phase motor. In comparison to the prior art which requires a full 360° distribution of stator segments the motor of FIG. 20 provides a complete operative motor with a distribution of stator segments of less than 180°, which may be useful in certain applications such as, by way of example, applications wherein space may not allow a motor housing which is symmetrical with respect to the shaft. Such configurations also allow the use of a standard rotor with varying numbers of stator segments to provide varying torque output to meet specific application requirements and/or to provide two phase or three phase operation with the same basic mechanical parts. The embodiment of FIG. 21 is similar, though illustrates the point that the motor segments need not be limited to even numbers of stator poles but may use odd numbers of poles, specifically three in the embodiment shown, though the magnetic balancing in such configurations is not as good as those configurations using an even number of stator poles per stator pole group.

Figure 22:
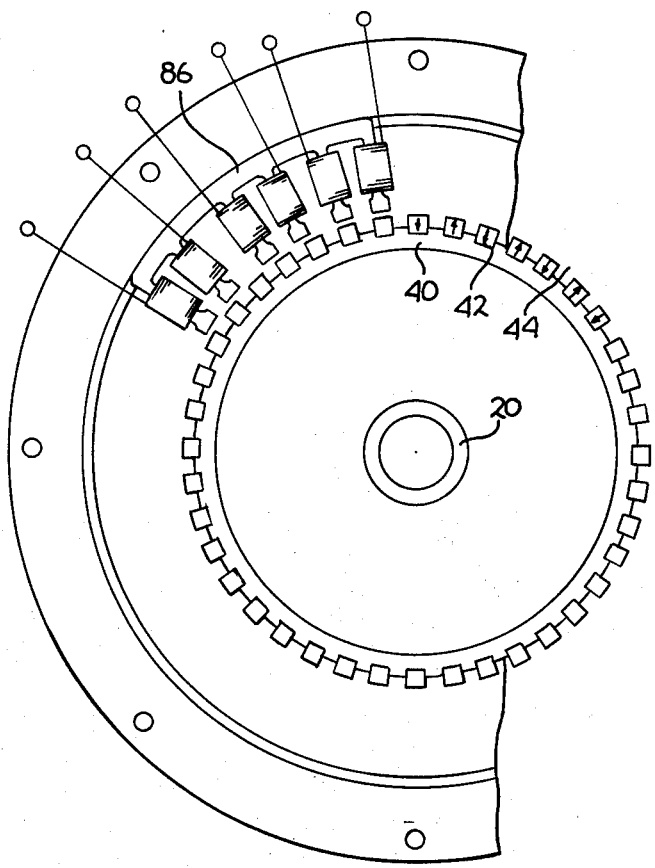
Figure 23:
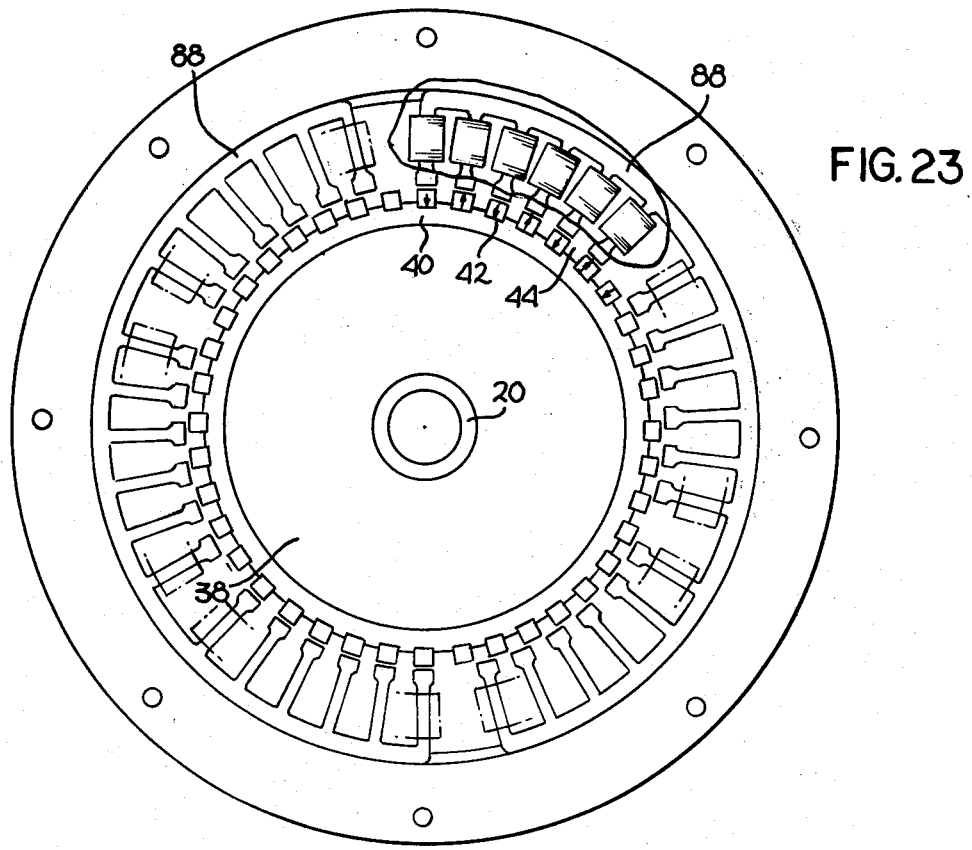
FIG. 23 is a schematic representation of a stepper motor comprising two independent stator assemblies, each capable of acting with the rotor to provide an independent step motor.
Figure 24:
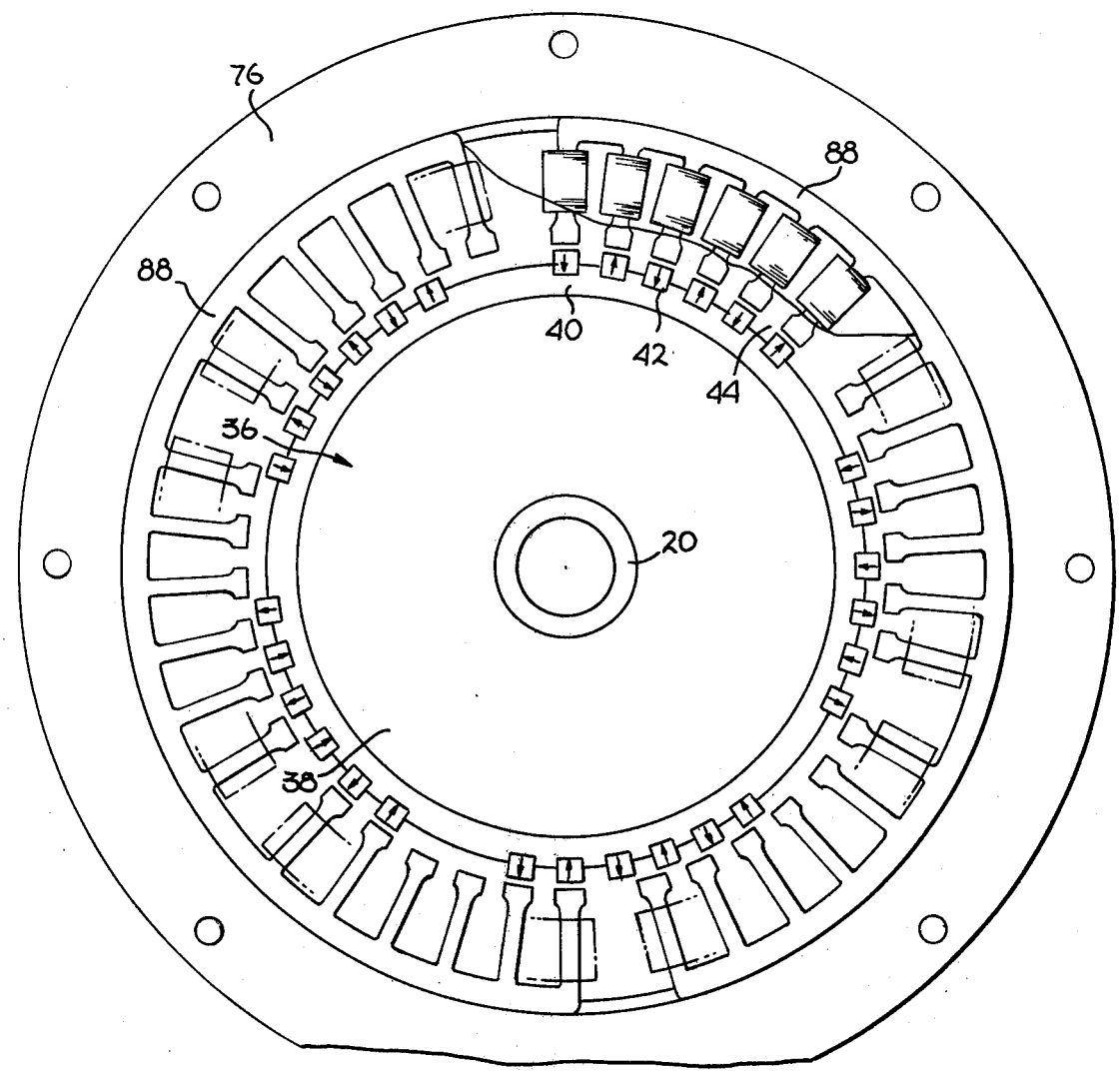
FIG. 24 is a schematic representation of a step motor similar to the step motor of FIG. 23, though with the rotor poles also being grouped into rotor pole groups.

Now referring to FIG. 22, still another embodiment of the invention may be seen. This embodiment utilizes a single stator segment 86 which comprises an entire stator assembly for a three phase motor. The stator segment 86 contains three groups of two poles each, the poles in each pole group being wound to provide opposite polarity on the two poles when energized. The pole groups, of course, are staggered as hereinbefore described so as to provide the desired incremental motion on the appropriate sequential excitation thereof. Obviously, additional such stator segments may be provided for redundancy and/or coupled in series or parallel to provide greater torque as required. Similarly, greater numbers of poles per pole group may be provided on the segments such as in the embodiment of FIG. 23 wherein each of the stator segments 88 has an arc length approaching 180°. Finally, in FIG. 24 a still further alternate embodiment is disclosed. This embodiment utilizes the same stator segments 88 as the embodiment of FIG. 23. However, the rotor, rather than being a continuous pattern of equally spaced poles of opposite polarity, is a pattern of lesser number of poles, each pole being positioned and of a polarity as if actually located in a continuous pattern. By way of further explanation, the specific rotor of FIG. 24 contains six groups of six poles each, the rotor poles in each rotor pole group being of equal spacing and opposite polarity. Further, the pole groups themselves are positioned with respect to each other such that the angular separation therebetween is equal to an integer number times the rotor pole pitch, wherein the integer number is a number exceeding 1. Specifically, in the example of FIG. 24 the integer number is 3, in that the last pole of any one group is separated from the first pole of the next group by an angular separation equal to three times the rotor pole pitch, leaving therebetween two theoretical pole positions for which there are in fact no poles. Since two theoretical pole positions are unoccupied the last pole of each rotor pole group has a polarity opposite the first pole of the next pole of the next group, a situation which would always be true for any even number of unoccupied pole positions in other embodiments. If, on the other hand, an odd number pole positions were unoccupied, then the last pole in each pole group and the first pole in the next pole group would have the same polarity. This type of rotor is generally not preferred, though may have useful application in situations wherein space requirements prohibit the use of a full rotor pattern. By way of example, a remote camera system might have a rotating wheel carrying five different light filters, each of which has to be positionable in front of a lens. The size of the filters themselves carried on the rotor might prevent the continuation of the rotor magnet pattern past the edges of the filters, though allow ample space therebetween. Obviously this general concept is applicable to many of the configurations disclosed herein, being illustrated with respect to this one configuration for exemplary purposes only.

While the preferred embodiment and various alternate embodiments of the present invention have been disclosed and described in detail herein, it will be understood by those skilled in the art that various changes in form and detail may be made therein without departing from the spirit and scope of the invention.

I claim:

1. A motor for encouraging relative motion between a rotor assembly and a stator assembly comprising:
    a rotor assembly presenting at a rotor surface a plurality of rotor poles equally spaced at a predetermined pitch, each said pole having the opposite polarity of the immediately adjacent rotor poles;
    a stator assembly having a plurality of individual stator segments, each of said segments presenting a plurality of poles forming a pole group adjacent said rotor surface, each of said pole groups having at least three poles having the same pitch as said poles on said rotor assembly, said stator segments being staggered adjacent said surface of said rotor so that when said poles in at least one of said stator segments is aligned with the adjacent said poles of said rotor assembly, said poles in other said stator segments are offset from said poles on said rotor assembly by a fraction of said predetermined pitch of said rotor poles, said fraction being any ratio of two unequal integers such that the product of said fraction and the number of stator segments is an integer; and
    means for controllably polarizing said plurality of poles in said stator segments so that adjacent poles in the respective said segments have different polarity.

2. The motor of claim 1 wherein said rotor surface is a flat surface.

3. The motor of claim 1 wherein said rotor surface is a cylindrical surface.

4. The motor of claim 3 wherein said stator assembly is a substantially coplanar assembly.

5. The motor of claim 4 wherein said stator segments collectively cover an arc about said rotor of substantially less than 360°.

6. The motor of claim 4 wherein said stator segments collectively cover an arc about said rotor of less than 180°.

7. The motor of claim 4 wherein said means for controllably polarizing said plurality of poles in any of said stator segments comprises toroidal windings on the back iron between poles of that stator segment.

8. The motor of claim 4 wherein said rotor assembly comprises a generally cylindrical rotor assembly having a plurality of individual permanent magnets magnetized in a radial direction, each supported adjacent its inner surface by a soft magnetic member and extending outward to the rotor surface.

9. The motor of claim 4 wherein said rotor assembly comprises at least one permanent magnet assembly having at least one permanent magnet and first and second pole pieces, said permanent magnet presenting north and south poles on first and second magnet surfaces thereof, said first and second pole pieces being coupled to said first and second magnet surfaces and each having a plurality of pole faces interfitting with the pole faces of the other to define a plurality of alternating poles at said surface of said rotor.

10. The motor of claim 9 wherein said motor is a rotary device having a shaft supported rotor assembly for rotation about the axis of said shaft, and wherein said at least one permanent magnet is magnetized in a direction substantially parallel to said shaft axis, said plurality of pole faces of each of said pole pieces projecting in a direction parallel to and radially spaced from said shaft axis to define a substantially cylindrical rotor surface.

11. The motor of claim 4 wherein said rotor assembly comprises at least one winding surrounding a soft magnetic core, said soft magnetic core including first and second pole members on the ends thereof, each said pole member having a plurality of pole faces interfitting with the pole faces of the other to define a plurality of poles at said surface of said rotor polarizable with opposite polarity by a current in said at least one winding.

12. The motor of claim 11 wherein said motor is a rotary device having a shaft supported rotor assembly for rotation about the axis of said shaft, and wherein the axis of said at least one winding is substantially concentric to said shaft axis, said plurality of pole faces of each of said pole pieces projecting in a direction parallel to and radially spaced from said shaft axis to define a substantially cylindrical rotor surface.

13. The motor of claim 1 wherein said motor is a two phase motor.

14. The motor of claim 1 wherein said motor is a three phase motor.

15. A motor for encouraging relative rotation between a rotor assembly and a stator assembly comprising:
a cylindrical rotor assembly presenting at a rotor surface a plurality of rotor poles equally spaced at a predetermined pitch, each said pole having the opposite polarity of the immediately adjacent rotor poles;
a stator assembly having at least one stator segment, each said stator segment having an arc length of less than 360° and presenting a plurality of pole groups adjacent said rotor surface, each of said pole groups having a plurality of poles with the same pitch as said poles on said rotor assembly, said pole groups in said at least one stator segment being staggered adjacent said surface of said rotor so that when said poles in a first said pole group is aligned with the adjacent said poles of said rotor assembly, said poles in other said pole group are offset from said poles on said rotor assembly by a fraction of said predetermined pitch of said rotor poles, said fraction being any ratio of two unequal integers such that the product of said fraction and a number of said pole groups in each said stator segment is an integer;
means for controllably polarizing said plurality of poles in any of said plurality of pole groups so that adjacent poles in the respective said pole groups have different polarity.

16. The motor of claim 15 wherein said stator assembly is a substantially coplanar assembly.

17. The motor of claim 16 wherein said at least one stator segment comprises only one stator segment.

18. The motor of claim 17 wherein said one stator segment has an arc length about said rotor of less than 180°.

19. The motor of claim 16 wherein said at least one stator segment comprises a plurality of stator segments.

20. The motor of claim 19 wherein the combined arc length of all of said stator segments is substantially less than 360°.

21. The motor of claim 16 wherein said at least one stator segment comprises at least two stator segments, each of said stator segments being wound and excited separately to provide redundancy in the rotor drive.

22. The motor of claim 16 wherein said motor is a two phase motor.

23. The motor of claim 16 wherein said motor is a three phase motor.

24. A motor for encouraging relative rotation between a rotor assembly and a stator assembly comprising:
a cylindrical assembly presenting at a rotor surface a plurality of rotor poles equally spaced at a predetermined pitch, each said pole having the opposite polarity of the immediately adjacent rotor poles;
a stator assembly having a plurality of individual stator segments, each of said segments presenting a plurality of poles adjacent said rotor surface having the same pitch as said poles on said rotor assembly, said stator segments being unsymmetrically staggered adjacent said surface of said rotor so that when said poles in any of said stator segments is aligned with the adjacent said poles of said rotor assembly, said poles in other stator segments are offset from said poles on said rotor assembly by a fraction of said predetermined pitch of said rotor poles, said fraction being any ratio of two unequal integers such that the product of said fraction and the number of stator segments is an integer; and
means for controllably polarizing said plurality of poles in said stator segments so that adjacent poles in the respective said segments have different polarity.

25. A motor for encouraging relative motion between a rotor assembly and a stator assembly comprising:
a cylindrical rotor assembly presenting at a rotor surface a plurality of rotor poles arranged in a plurality of rotor pole groups, said poles in each rotor pole group being equally spaced at a predetermined pitch with each said pole having the opposite polarity of the immediately adjacent rotor poles in the respective rotor pole group, said rotor pole groups being disposed about said rotor with an angular separation therebetween equal to an integer number times said predetermined pitch, where said integer number exceeds one, and having a polarity representing a combination of the alternating polarity pattern of each other rotor pole group whereby the rotor assembly is characterized by pole groups separated by vacant pole portions;

a stator assembly presenting a plurality of pole groups adjacent said rotor surface, each of said pole groups having a plurality of poles with the same pitch as said poles on said rotor assembly, said pole groups being staggered adjacent said surface of said rotor so that when said poles in any of said pole groups is aligned with the adjacent said poles of said rotor assembly, said poles in other said pole groups are offset from said poles or vacant pole positions on said rotor assembly by a fraction of said predetermined pitch of said rotor poles, said fraction being any ratio of two unequal integers such that the product of said fraction and a predetermined number of said pole groups is an integer; and means for controllably polarizing said plurality of poles in any of said plurality of pole groups so that adjacent poles in the respective said pole groups have different polarity.

26. A motor for encouraging relative rotation between a rotor assembly and a stator assembly comprising:

a cylindrical rotor assembly presenting at a rotor surface a plurality of rotor poles equally spaced at a predetermined pitch, each said pole having the opposite polarity of the immediately adjacent rotor poles;

a stator assembly having a plurality of individual stator segments collectively spanning an arc about said rotor of less than 180°, each of said segments presenting a plurality of poles forming a pole group adjacent said rotor surface, each of said pole groups having poles having the same pitch as said poles on said rotor assembly, said stator segments being staggered adjacent said surface of said rotor so that when said poles in at least one of said stator segments is aligned with the adjacent said poles of said rotor assembly, said poles in other said stator segments are offset from said poles on said rotor assembly by a fraction of said predetermined pitch of said rotor poles, said fraction being any ratio of two unequal integers such that the product of said fraction and the number of stator segments is an integer; and means for controllably polarizing said plurality of poles in said stator segments so that adjacent poles in the respective said segments have different polarity.

* * * * *